United States Patent
Park et al.

(10) Patent No.: US 11,025,171 B2
(45) Date of Patent: Jun. 1, 2021

(54) POWER CONVERSION APPARATUS HAVING SCOTT-T TRANSFORMER

(71) Applicant: Hyundai Electric & Energy Systems Co., Ltd., Seoul (KR)

(72) Inventors: Young-Ho Park, Seoul (KR); Seung-Pyo Ryu, Seoul (KR); Soo-Nam Kim, Seoul (KR); Seong-Il Kim, Seoul (KR); Milovanovic Stefan, Lausanne (CH); Dujic Drazen, Lausanne (CH)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 0 days.

(21) Appl. No.: 16/634,490

(22) PCT Filed: May 2, 2019

(86) PCT No.: PCT/KR2019/005262
§ 371 (c)(1),
(2) Date: Jan. 27, 2020

(87) PCT Pub. No.: WO2019/212257
PCT Pub. Date: Nov. 7, 2019

(65) Prior Publication Data
US 2020/0186043 A1    Jun. 11, 2020

(30) Foreign Application Priority Data

May 2, 2018   (KR) .................. 10-2018-0050472
Apr. 29, 2019 (KR) .................. 10-2019-0049955

(51) Int. Cl.
*H02M 3/335*    (2006.01)
*H01F 27/42*    (2006.01)
(Continued)

(52) U.S. Cl.
CPC ........ *H02M 3/33569* (2013.01); *H01F 27/42* (2013.01); *H02M 7/06* (2013.01); *H02M 7/483* (2013.01); *H02M 7/493* (2013.01)

(58) Field of Classification Search
CPC .... H02M 3/33569; H02M 7/06; H02M 7/483; H02M 7/493; H01F 27/42
See application file for complete search history.

(56) References Cited

U.S. PATENT DOCUMENTS

| 7,050,311 B2 * | 5/2006 | Lai .................. H02M 5/225 363/37 |
| 9,139,100 B2 | 9/2015 | Ichikawa et al. |
| 2020/0195126 A1 * | 6/2020 | Deng .................. H02M 7/2173 |

FOREIGN PATENT DOCUMENTS

| CN | 106300996 A | 1/2017 |
| CN | 106998152 A | 8/2017 |

(Continued)

OTHER PUBLICATIONS

Stefan Milovanovic et al., "MMC-based High Power DC-DC Converter Employing Scott Transformer", IEEE, PCIM Europe 2018, pp. 226-232. Jun. 2018.*

(Continued)

*Primary Examiner* — Gary L Laxton
(74) *Attorney, Agent, or Firm* — Mintz Levin Cohn Ferris Glovsky and Popeo, P.C.; Peter F. Corless

(57) ABSTRACT

A power converter having a Scott-T transformer includes a direct current to alternating current converter configured to have at least two multilevel converters converting input direct current power to alternating current power, a Scott-T transformer configured to operate in medium frequency of several hundreds of Hz to several tens of kHz, to transform a voltage level of the alternating current power from each of the at least two multilevel converters of the direct current to alternating current converter into three-phase alternating current power, and to output the three-phase alternating current power, and an alternating current to direct current converter configured to convert the three-phase alternating current power from the Scott-T transformer to direct current power.

10 Claims, 13 Drawing Sheets

(51) Int. Cl.
*H02M 7/06* (2006.01)
*H02M 7/483* (2007.01)
*H02M 7/493* (2007.01)

(56) References Cited

FOREIGN PATENT DOCUMENTS

| | | |
|---|---|---|
| CN | 107546983 A | 1/2018 |
| EP | EP 1 589 648 A2 | 10/2005 |
| EP | 2192679 A1 | 6/2010 |
| EP | 2 458 725 A1 | 5/2012 |
| EP | 2 637 296 A1 | 9/2013 |
| JP | 2017-192297 A | 10/2017 |
| KR | 101843652 B1 | 3/2018 |

OTHER PUBLICATIONS

V. Pires, et al, "A Modular Multilevel Power Converter System for Photovoltaic Applications", International Conference on Power Engineering, Energy and Electrical Drives, 5 pages, May 2011.
Xiang et al., "The Isolated Resonant Modular Multilevel Converters with Large Step-ratio for MVDC Applications", IEEE 18th Workshop on Control and Modeling for Power Electronics (COMPEL), Jul. 9, 2017, 6 pages.

\* cited by examiner

[Fig.1]
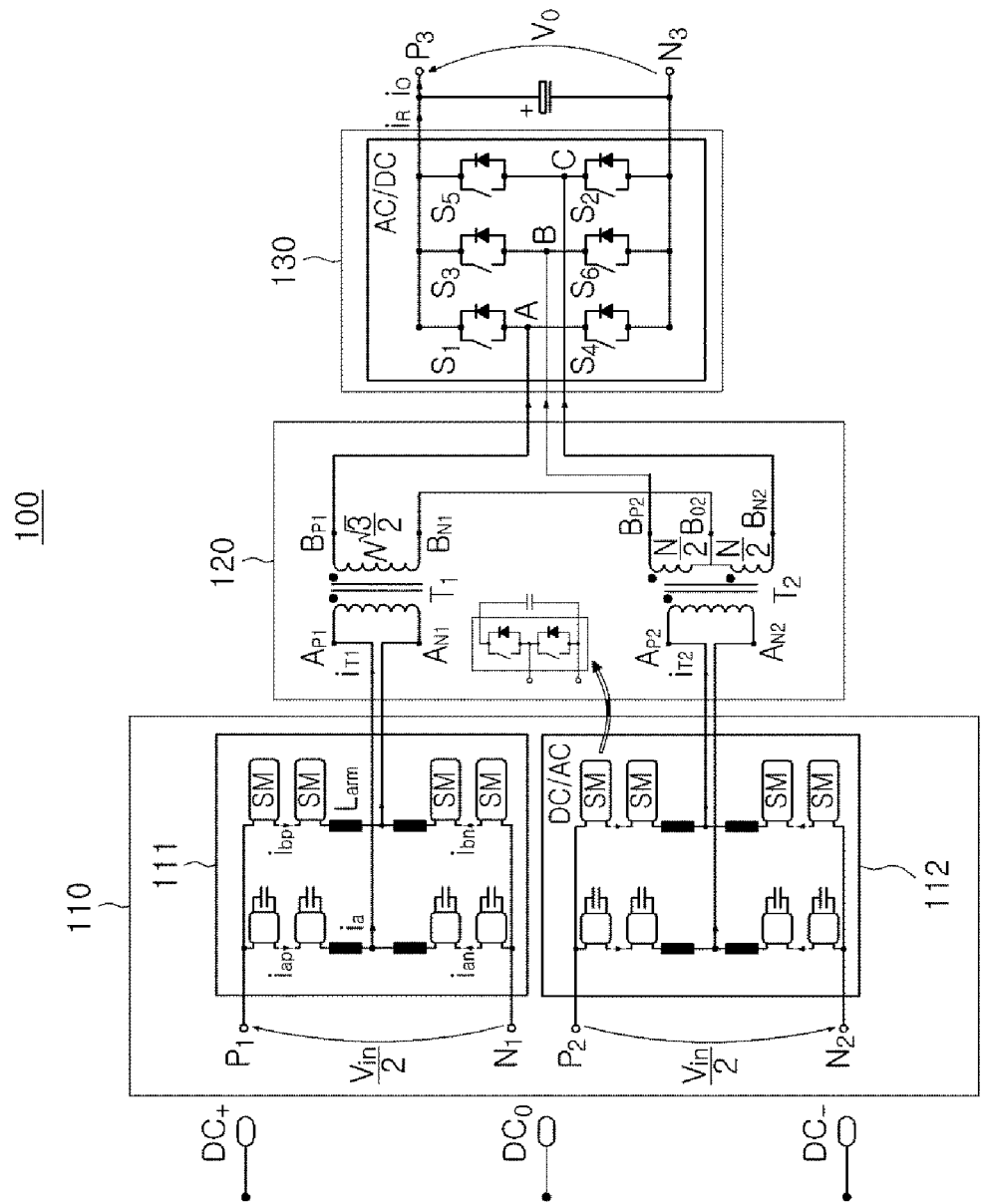

[Fig.2]
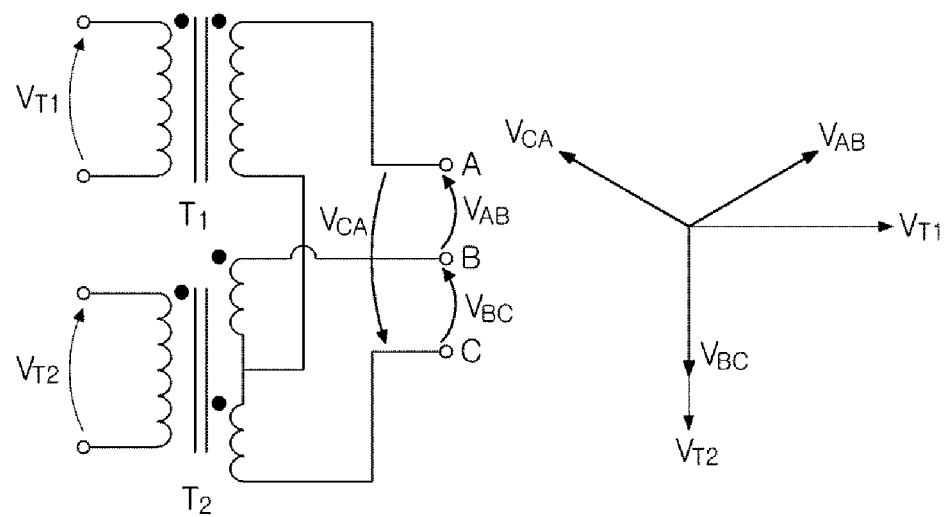

【Fig.3】
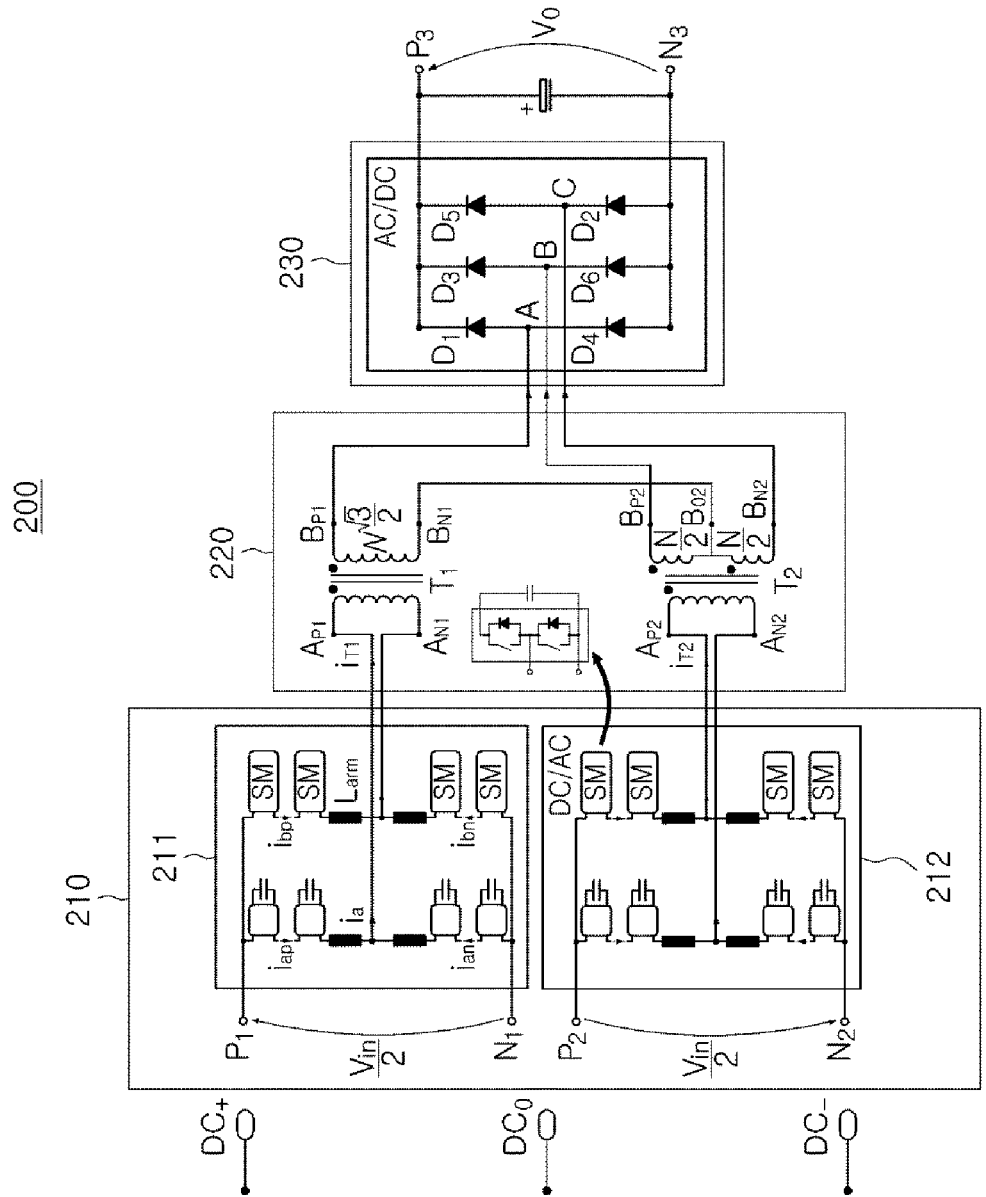

[Fig.4A]
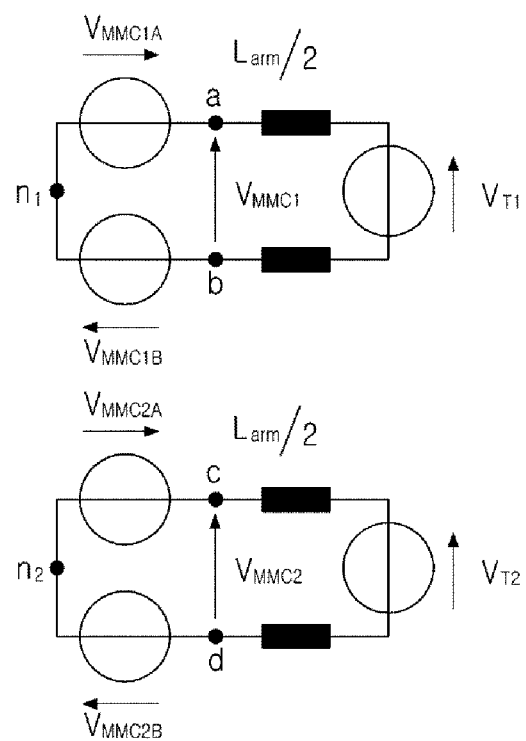

[Fig.4B]
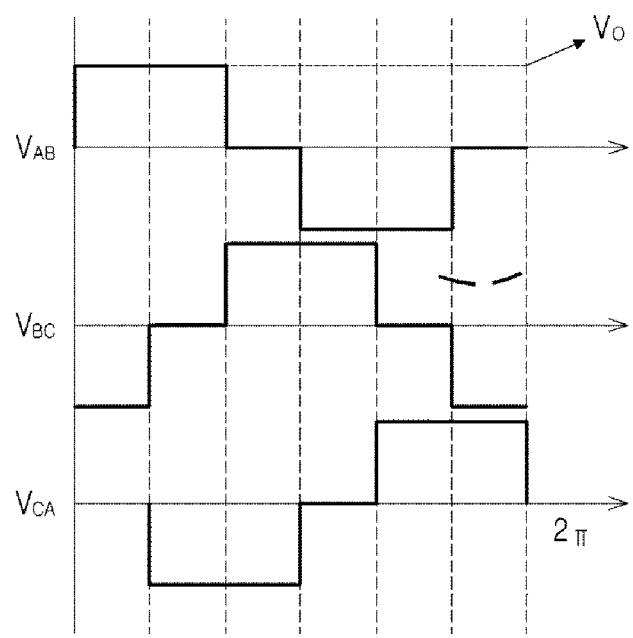

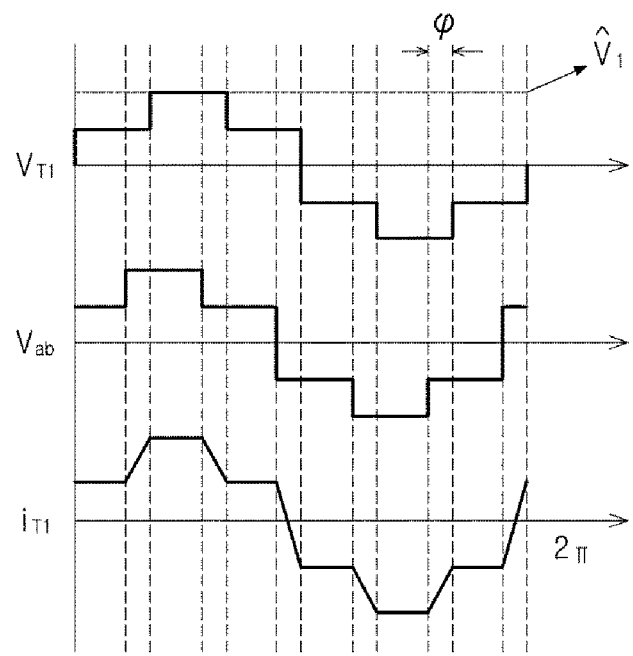
[Fig.4C]

[Fig.4D]
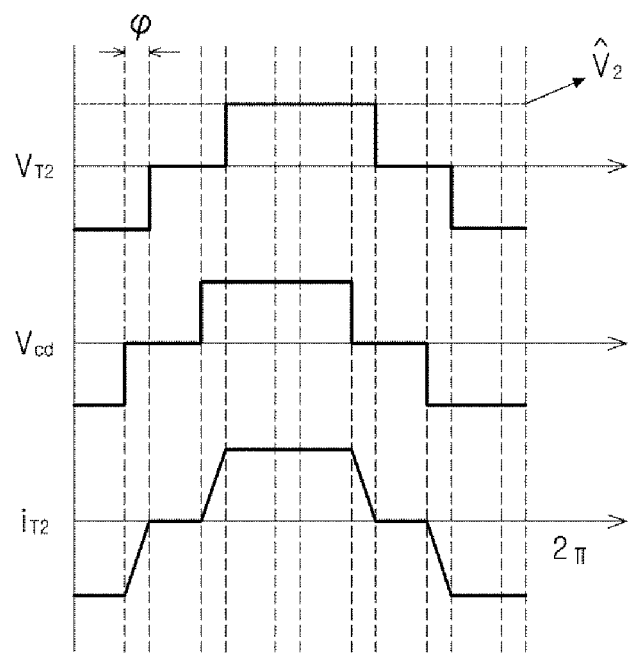

[Fig.5]
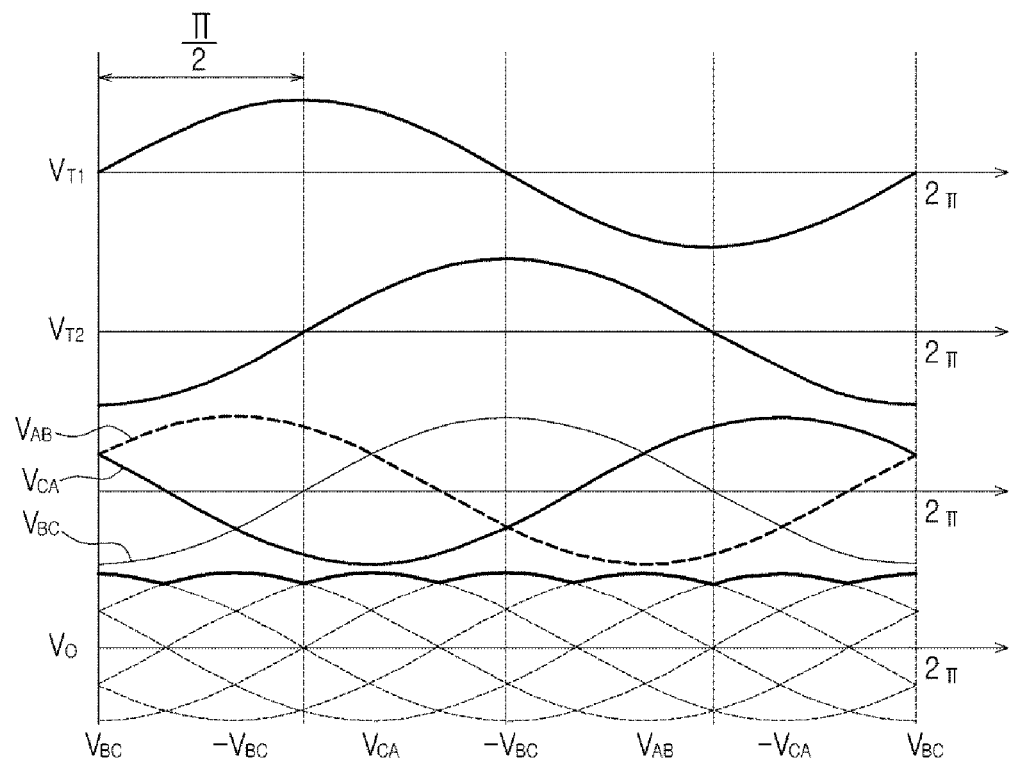
[Fig.6A]
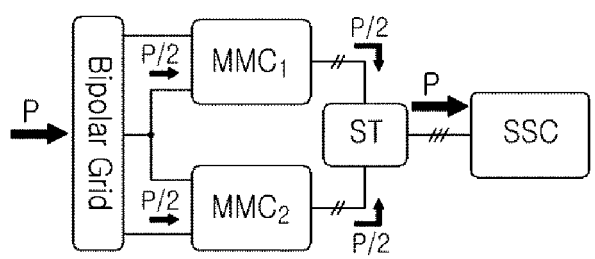

【Fig.6B】
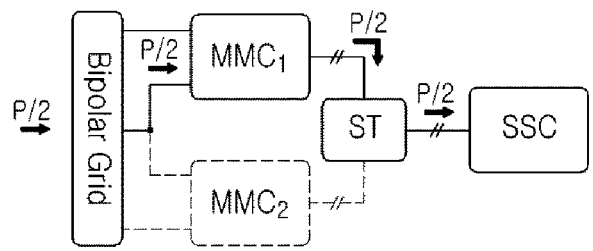
【Fig.6C】
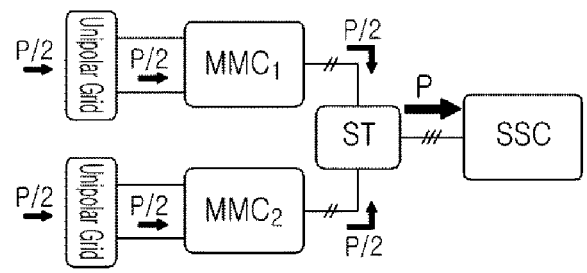
【Fig.6D】
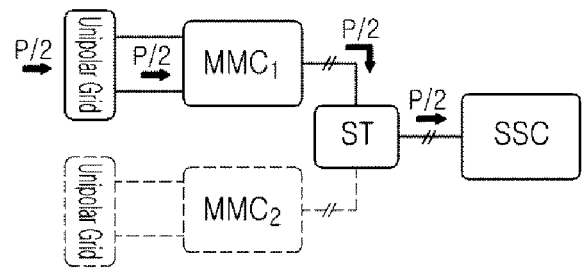

[Fig.7A]
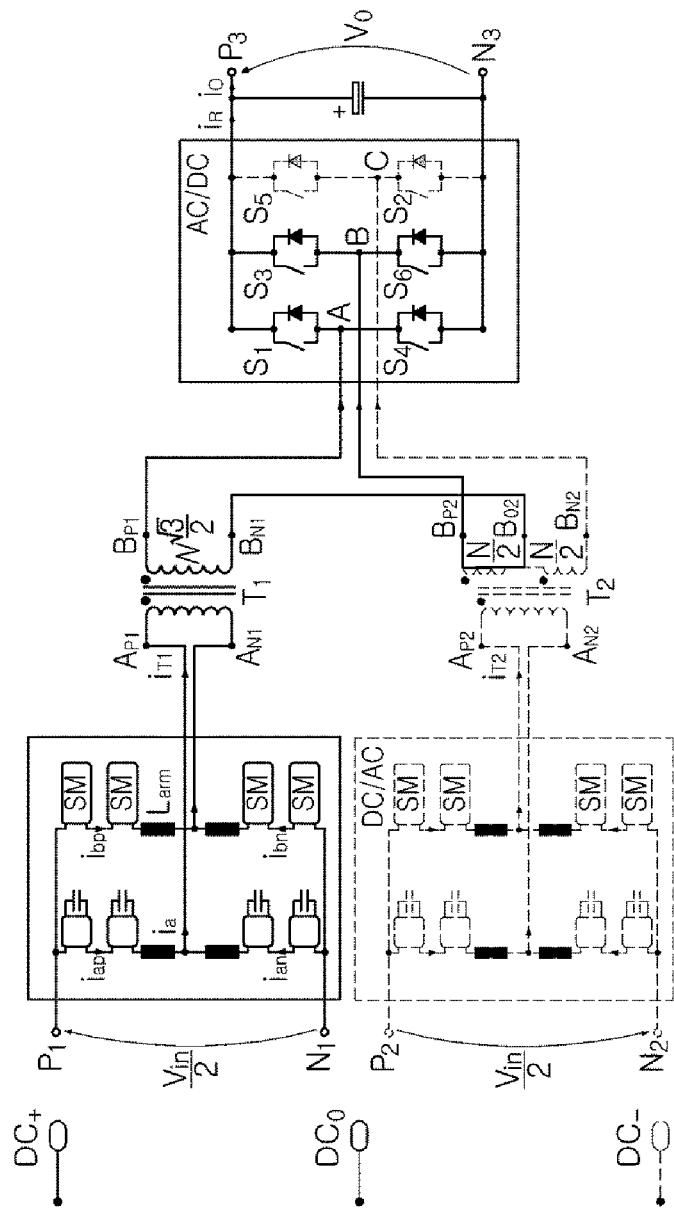

[Fig.7B]
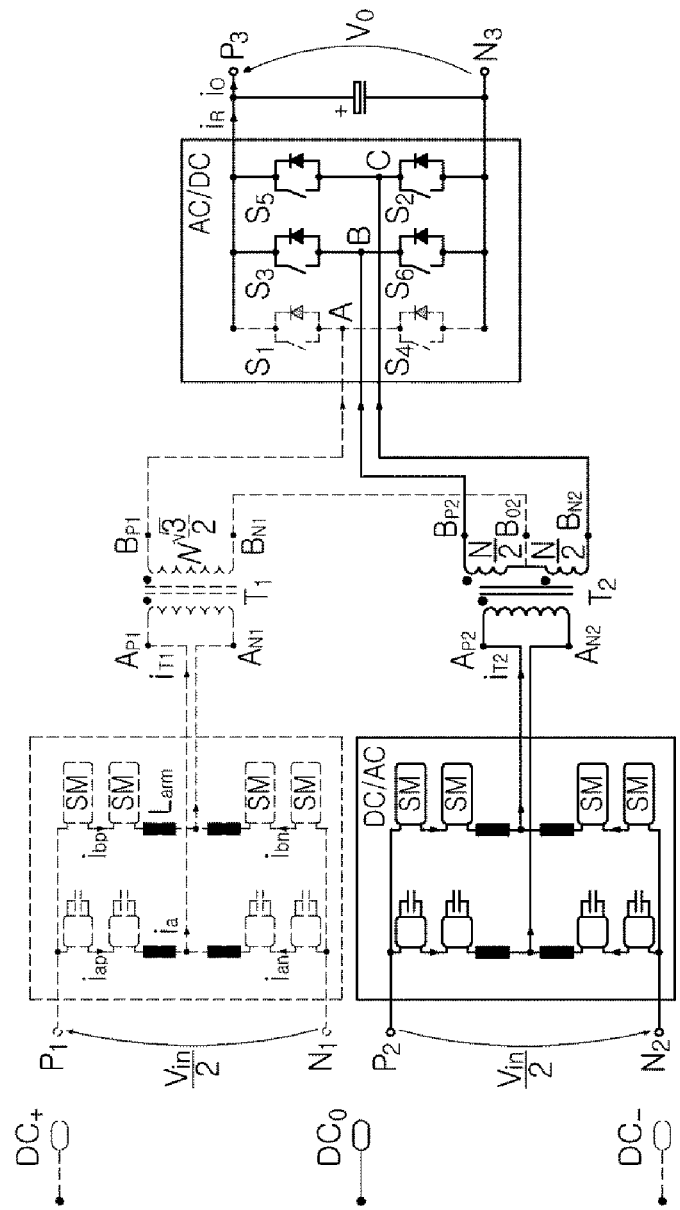

[Fig.7C]
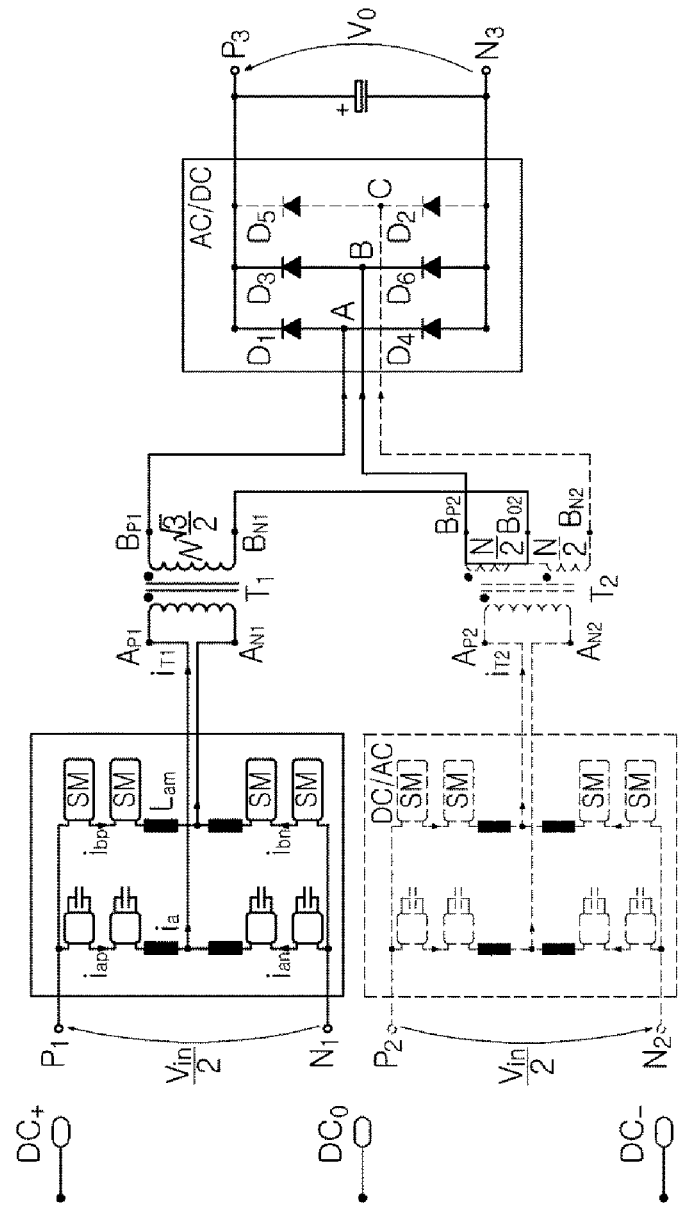

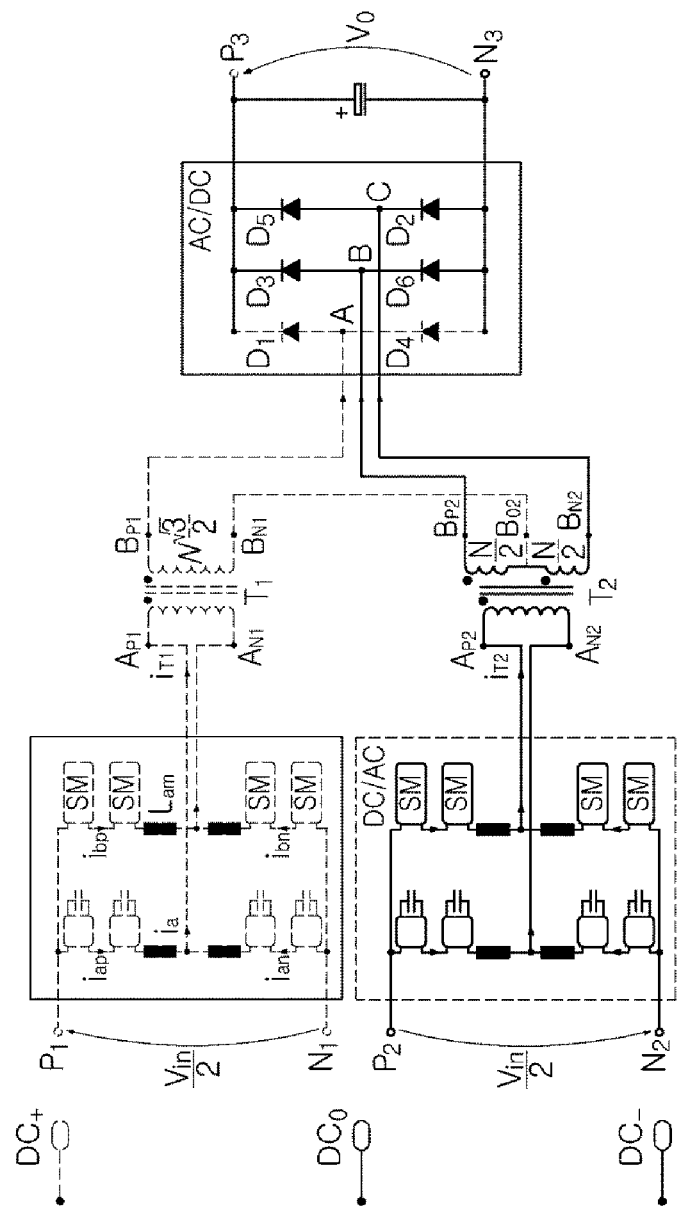
[Fig. 7D]

POWER CONVERSION APPARATUS HAVING SCOTT-T TRANSFORMER

CROSS-REFERENCE TO RELATED APPLICATIONS

This application is a National Phase application filed under 35 USC 371 of PCT International Application PCT/KR2019/005262 with an International Filing Date of May 2, 2019, which claims priority from Korean Application 10-2019-0049955 filed on Apr. 29, 2019, and Korean Application 10-2018-0050472 filed on May 2, 2018. The entire contents of these applications are incorporated herein by reference in their entirety.

TECHNICAL FIELD

The present disclosure relates to a power converter having a Scott-T transformer.

BACKGROUND ART

Generally, a power converter is used in structures and vehicles such as marine plants, ships, trains, and the like.

Such structures and vehicles, such as marine plants, ships, trains, and the like, may require various power levels, and to this end, a high power direct current (DC)-alternating current (AC) converter or a high power direct current (DC)-direct current (DC) converter may be provided.

In the aforementioned power converter, a transformer, a plurality of multilevel converters, and the like, may be employed. However, a current increase may occur in at least one of the plurality of multilevel converters due to current imbalance in a transformer, and a power converter may not operate properly.

RELATED ART

Reference

Europe Registered Patent Notification No. 2458725
Europe Registered Patent Notification No. 2637296

DISCLOSURE

Technical Problem

An aspect of the present disclosure is to provide a power converter having a Scott-T transformer employed therein.

Technical Solution

According to an aspect of the present disclosure, a power converter having a Scott-T transformer includes a direct current to alternating current converter configured to have at least two multilevel converters converting input direct current power to alternating current power, a Scott-T transformer configured to operate in medium frequency of several hundreds of Hz to several tens of kHz, to transform a voltage level of the alternating current power from each of the at least two multilevel converters of the direct current to alternating current converter into three-phase alternating current power, and to output the three-phase alternating current power, and an alternating current to direct current converter configured to convert the three-phase alternating current power from the Scott-T transformer to direct current power.

Advantageous Effects

According to an example embodiment of the present disclosure, even when a fault occurs in a multilevel converter, normal power conversion may be performed, an effect of the present disclosure.

DESCRIPTION OF DRAWINGS

FIG. 1 is a schematic configuration diagram illustrating a power converter according to an example embodiment of the present disclosure;

FIG. 2 is a diagram illustrating a voltage phase of a Scott-T transformer employed in a power converter according to an example embodiment of the present disclosure;

FIG. 3 is a schematic configuration diagram illustrating a power converter according to another example embodiment of the present disclosure;

FIGS. 4A to 4D are conceptual circuit diagrams illustrating overall operations of a power converter and voltage-current waveform graphs according to an example embodiment of the present disclosure;

FIG. 5 is graphs illustrating voltage waveforms of a power converter according to an example embodiment or another example embodiment of the present disclosure;

FIGS. 6A to 6D are conceptual diagrams illustrating an operation performed when a bipolar grid or a plurality of unipolar grids are input in a power converter and a partial operation performed under the outage of one of the poles; and FIGS. 7A to 7D are diagrams illustrating a power converter according to an example embodiment and a partial operation performed when one pole of a bipolar grid is broken in a power converter according to another example embodiment.

BEST MODE FOR INVENTION

Hereinafter, embodiments of the present disclosure will be described in greater detail for a person having ordinary skill in the art to easily implement the present disclosure.

FIG. 1 is a schematic configuration diagram illustrating a power converter according to an example embodiment.

Referring to FIG. 1, a power converter 100 according to an example embodiment may include a direct current (DC) to alternating current (AC) converter 110, a Scott-T transformer 120, and an alternating current (AC) to direct current (DC) converter 130.

The DC to AC converter 110 may include at least two multilevel converters 111 and 112.

Each of the at least two multilevel converters 111 and 112 may convert input direct current (DC) power to alternating current (AC) power. The multilevel converters 111 and 112 may be module type multilevel converters.

Each of the multilevel converters 111 and 112 may include first DC terminals P1 and N1 and second DC terminals P2 and N2.

Each of the first and second multilevel converters 111 and 112 may be configured with four arms ARM, and each of the arms ARM may be implemented by a series connection of sub modules SM connected with arm inductors (Larm) in series. In other words, in first multilevel converters 111, a first arm may connect the terminals $P_1$ and $A_{P1}$, a second arm may connect the terminals $N_1$ and $A_{N1}$, a third arm may connect the terminals $P_2$ and $A_{P2}$, and a fourth arm may connect the terminals $N_2$ and $A_{N2}$. Each of the first and second multilevel converters 111 and 112 may include branch A and branch B. The branch A may include a first arm in an upper portion, a second arm in a lower portion, and an arm inductor connected in series. The branch B may include a third arm in an upper portion, a fourth arm in a lower portion, and an arm inductor connected in series.

The sub module SM may be implemented by a half bridge HB cell, a full bridge FB cell, or a combination of a half bridge and a full bridge. The arm ARM may be implemented by a series combination of sub-modules in which various types of sub-modules connected to the inductor Larm in series are combined.

A bipolar medium voltage direct current (DC) (MVDC) network having a neutral line may be used on an MVDC side, and in the case in which three poles DC+, DCo, and DC− are provided, the DC terminal $N_1$ of the first multilevel converter 111 and the DC terminal $P_2$ of the second multilevel converter 112 may also be connected. In this case, the DC terminal $P_1$ of the first multilevel converter 111 may be connected to the pole DC+, the DC terminal $N_2$ of the second multilevel converter 112 may be connected to the pole DC−, and the DC terminal $N_1$ of the first multilevel converter 111 and the DC terminal $P_2$ of the second multilevel converter 112 may be connected to DCo.

The AC terminal of the first multilevel converter 111 may be connected to a first primary winding wire $P_1$ ($A_{P1}$ to $A_{N1}$) of a first transformer $T_1$ of the Scott-T transformer 120, and the AC terminal of the second multilevel converter 112 may be connected to a second primary winding wire $P_2$ of a second transformer $T_2$ ($A_{P2}$-$A_{N2}$) of the Scott-T transformer 120. A first secondary winding wire $S_1$ of the first transformer $T_1$ may have a first terminal $B_{P1}$ and a second terminal $B_{N1}$. A second secondary winding wire $S_2$ of the second transformer $T_2$ may have a first terminal $B_{P2}$, a second terminal $B_{O2}$, and a third terminal $B_{N2}$, and the second terminal $B_{O2}$ may be a central tap connection between the first terminal $B_{P2}$ and the third terminal $B_{N2}$. Also, the second terminal $B_{N1}$ of the first secondary winding wire $S_1$ of the first transformer $T_1$ may be connected to the second terminal $B_{O2}$ of the second secondary winding wire $S_2$ of the second transformer $T_2$.

To interface the MVDC network, the first and second multilevel converters 111 and 112 may employ the sub modules SM. The number of the sub modules SM may vary depending on a usable voltage level of the MVDC network, a selected voltage class of a semiconductor used to implement the sub modules SM, and a specific control margin irrelevant to a basic operational principle of a converter.

For example, the sub module SM may be implemented by an active semiconductor device, and the active semiconductor device may allow freedom related to selection of an operational frequency of the first and second transformers $T_1$ and $T_2$ used in the Scott-T transformer 120. An exact operational frequency may be determined by optimization of a design based on various parameters, and generally, an operational frequency ranging from several hundreds of Hz to several kHz may be achieved by a high-tech semiconductor device.

In the case in which a high voltage semiconductor (e.g., 6.5 kV) is used, the number of the sub modules SM of the first and second multilevel converters 111 and 112 may be further reduced, but an allowable operational frequency may be limited to be less than several tens of kHz. In the case in which a low voltage semiconductor (e.g., 1.7 kV) is used, the number of the sub modules SM of the first and second multilevel converters 111 and 112 may increase, but a higher switching frequency may be available.

FIG. 2 is a diagram illustrating a voltage phase of a Scott-T transformer employed in a power converter according to an example embodiment.

Referring to FIG. 2, a Scott-T transformer 120 may be implemented by using two double winding transformers $T_1$ and $T_2$. Each of the transformers $T_1$ and $T_2$, first and second transformers $T_1$ and $T_2$, may include a single primary winding wire Pk and a single secondary winding wire $S_k$ (k indicates 1 or 2 and winding wires of $T_1$ and $T_2$). A second secondary winding wire $S_2$ of the second transformer $T_2$ may be divided into two portions. The number of winding wires of the two portions may be N/2, a central tap connection may be available accordingly, and the two portions may be connected to a lower end of a first secondary winding wire $S_1$ of the first transformer $T_1$.

An upper end of the first secondary winding wire $S_1$ of the first transformer $T_1$ and upper and lower ends of the second secondary winding wire $S_2$ of the second transformer $T_2$ may be used as secondary side terminals of the Scott-T transformer 120 indicated by A, B and C. The number of the first secondary winding wire $S_1$ of the first transformer $T_1$ may be set to $$N\frac{\sqrt{3}}{2}$$

to secure a normal operation of the Scott-T transformer 120.

Consequently, by configuring the number of the first primary winding turns $P_1$ of the first transformer $T_1$ and the number of the second primary winding turns $P_2$ of the second transformer $T_2$ to be the same, a turns ratio relation may be induced to be $$m1 = \frac{2}{\sqrt{3}}m2.$$

Line-to-line voltages VAB, VBC and VCA of a secondary side terminal of the Scott-T transformer 120 may be a balanced three phase having a phase difference of 120 degrees, whereas voltages $V_{T1}$ and $V_{T2}$ of a primary side terminal of the Scott-T transformer 120 may be a single phase having a phase difference of 90 degrees.

The Scott-T transformer 120 may operate in medium frequency of several hundreds of Hz to several tens of kHz.

When the regular Scott-Transformer mentioned in the present disclosure is used in European railways, 16 and ⅔ Hz, 50 Hz or 60 Hz may be used as a use frequency in European railways. When a Scott-T transformer operates in commercial frequency of 50 Hz or 60 Hz, a volume and a weight may increase. Differently from the above-described example, the Scott-T transformer 120 of the present disclosure may operate in medium frequency of several hundreds of Hz to several tens of kHz such that a volume and a weight may be reduced to several tens % as compared to a Scott-T transformer operating in commercial frequency. When the Scott-T transformer operating in commercial frequency as in the prior art operates in frequency of several hundreds of Hz or less to several tens of kHz or higher, the Scott-T transformer may not operate properly, and the reduction of a size and a weight may not be effective. Thus, it may be necessary to develop a new Scott-T transformer by applying an appropriate core material or a winding wire to a Scott-T transformer to operate the Scott-T transformer in medium frequency. Also, when semiconductor properties of a AC-DC converter or a DC-AC converter is developed along with a Scott-T transformer, the Scott-T transformer may also operate in high frequency of several hundreds of kHz or higher.

The DC to AC converter 110 and the AC to DC converter 130 may also operate in medium frequency of several hundreds of Hz to several tens of kHz.

The DC to AC converter 110 may convert bipolar direct current power or unipolar direct current power into two single phase alternating current powers having a phase difference of 90 degrees, and the Scott-T transformer 120 may convert the two single phase alternating current powers into three-phase alternating current power, and the AC to DC converter 130 may convert the three-phase alternating current power into a unipolar direct current power.

Each of the AC to DC converters 130 may include three legs connected to one another in parallel, each having two semiconductor switches $S_1$ and $S_4$, $S_3$ and $S_6$, and $S_5$ and $S_2$, connected to each other in series with middle point accessible.

The AC to DC converter 130 may include DC terminals, a first DC terminal $P_3$ and a second DC terminal $N_3$, and may include AC terminals, a first AC terminal A, a second AC terminal AB, and a third AC terminal C. The AC terminal of the AC to DC converter 130 may be connected to secondary side terminals of the Scott-T transformer 120, which are $B_{P1}$, $B_{P2}$, and $B_{N2}$. A filter, a capacitor bank, may be disposed in a region of the DC terminal of the AC to DC converter 130.

An AC to DC converter 130 may operate in a square wave voltage to significantly reduce switching loss.

When the AC to DC converter 130 is configured to have three legs connected to one another in parallel, each having the two semiconductor switches $S_1$ and $S_4$, $S_3$ and $S_6$, and $S_5$ and $S_2$, connected to each other in series with middle point accessible, each of the three legs may receive alternating current power of each of phases of the three-phase alternating current power from a Scott-T transformer 120, and the three legs may operate by six-step operation and may transfer the power bidirectionally.

The AC to DC converter 130 may receive the three-phase alternating current power from the Scott-T transformer 120 and may have three legs, such that the number of devices may be reduced as compared to a case in which the AC to DC converter receives two single-phase alternating current from two normal transformers, which has two H-bridges.

FIG. 3 is a schematic configuration diagram illustrating a power converter according to another example embodiment.

Referring to FIG. 3 along with FIG. 1, a power converter 200 according to another example embodiment may include an alternating current (AC) to direct current (DC) converter 230 configured differently from the AC to DC converter 130, as compared to the power converter 100 according to the aforementioned example embodiment in FIG. 1.

The AC to DC converter 230 of the power converter 200 in another example embodiment may include three legs connected to one another in parallel, each having two diodes $D_1$ and $D_4$, $D_3$ and $D_6$, and $D_5$ and $D_2$, connected to each other in series with middle point accessible, as compared to the AC to DC converter 130 of the power converter 100 illustrated in FIG. 1. Accordingly, power may be transferred unidirectionally. Similarly, the AC to DC converter 230 may receive three-phase alternating current power from the Scott-T transformer 220 and may include three legs. Accordingly, the number of devices may be reduced as compared to a case in which the AC to DC converter includes two H-bridges, and a square wave may be rectified, and efficiency may increase.

There may be no phase change in relation to an MVDC side interface and the Scott-T transformer in the power converter 200, but an operational principle of the power converter 200 may be slightly different from an operational principle of the power converter 100 illustrated in FIG. 1.

Instead of controlling phase between voltages of DC-AC converter and AC-DC converter, only voltage of DC-AC converter needs to be controlled. First and second multilevel converters 211 and 212 may operate to provide sinusoidal or square wave voltages VMMC1 and VMMC2 from AC terminals of the first and second multilevel converters 211 and 212 to a primary winding wire of the Scott-T transformer 220. A fundamental frequency of the voltages VMMC1 and VMMC2 may define operational frequencies of first and second transformers T1 and T2 of the Scott-T transformer 220. To control an output voltage, a magnitude of a voltage applied to the first and second transformers T1 and T2 may need to be adjusted. Voltages VT1 and VT2 of the first and second transformers T1 and T2 may need to be generated with a phase shift equal to ¼ of a fundamental interval (90 degrees electrical degree), and line to line voltages VAB, VBC, and VCA of a secondary winding wire of a Scott-T transformer 320 may be symmetrical to one another.

The other descriptions of the direct current (DC) to alternating current (AC) converter 210 and the Scott-T transformer 220 are the same as or similar to the descriptions of the direct current (DC) to alternating current (AC) converter 110 and the Scott-T transformer 120 of the power converter 100 in the aforementioned example embodiment, and thus, the detailed descriptions thereof will not be repeated.

FIGS. 4A to 4D are conceptual circuit diagrams illustrating overall operations of a power converter and voltage-current waveform graphs according to an example embodiment.

Referring to FIGS. 4A to 4D along with FIG. 1, equivalent circuits of first and second multilevel converters 211 and 212 connected to first and second transformers T1 and T2, respectively, are illustrated in FIG. 4A.

As illustrated in FIG. 4A, by adjusting phase shifts of a voltage waveform VMMC1 (a voltage between branch A and branch B of the first multilevel converter 111) and a voltage waveform VMMC2 (a voltage between branch A and branch B of second multilevel converter 112) with respect to voltages (provided by the AC to DC converter 130) generated from the secondary side, currents of the first and second transformers T1 and T2 may be controlled.

A phase difference φ between the voltage VMMC1 of the first multilevel converter 111 and a voltage $V_{T1}$ of a first primary winding wire $P_1$ of a relevant first transformer $T_1$, and between the voltage VMMC2 of the second multilevel converter 112 and a voltage $V_{T2}$ of a second primary winding wire $P_2$ of the relevant second transformer may be calculated. In this case, the voltage VMMC1 of the first multilevel converter 111 and the voltage VMMC2 of the second multilevel converter 112 may be controlled to be synchronized to a waveform generated by an AC to DC converter 130 in the AC terminals thereof, in VAB, VBC and VCA.

Signals related to a leg of the AC to DC converter 130 may be phase-shifted from each other by ⅓ of a fundamental period. In this manner, voltage waveforms of AC terminals A, B and C may be generated such that phases of the voltage waveforms are not matched with one another in two separate voltage levels 0 and Vo in relation to a DC terminal $N_3$ by a phase of each of legs of the AC to DC converter 130. The AC terminals VAB, VBC and VCA of the AC to DC converter 130 in the above reference line may have a voltage of three-level form (as a result of direct deduction of both leg voltages) having levels of Vo, 0 and −Vo (please see FIG. 4B).

The above voltage may correspond to the line-to-line voltages VAB, VBC and VCA of the AC terminal of the AC to DC converter 130. $V_{T1}$ (the voltage of the first primary winding wire $P_1$ of the first transformer $T_1$) and $V_{T2}$ (the voltage of the second primary winding wire $P_2$ of the second transformer $T_2$) may be calculated by equations as below.

$$V_{T1} = m_1 \frac{V_{AB} - V_{CA}}{2}$$

$$V_{T2} = m_2 V_{BC}$$

In the equation, $m_1$ indicates a turns ratio between primary and secondary winding turns of a transformer $T_1$, and $m_2$ indicates a turns ratio between primary and secondary winding turns of a transformer $T_2$.

FIGS. 4C and 4D show waveforms generated by the first and second multilevel converters 111 and 112 and currents $iT_1$ and $iT_2$ flowing through primary winding wires $P_1$ and $P_2$ of each of the first and second transformers $T_1$ and $T_2$.

$\hat{V}_1$ and $\hat{V}_2$ may be calculated on the basis of a relation of turns ratios the transformers, the equations, and FIG. 4B. In the case in which an output voltage is Vo, $\hat{V}_1 = 2m_2 V_o/\sqrt{3}$ and $\hat{V}_2 = m_2 V_o$. In the case in which power at which the energy is transferred through the first and second transformers $T_1$ and $T_2$ are the same, the phases $\varphi_1$ and $\varphi_2$ may be the same.

Accordingly, the power converter according to the example embodiment may have a technical effect as below.

1. The number of semiconductor devices may be reduced: The DC to AC converter may use two single-phase multilevel converters instead of using two three-phase multilevel converters. As a result, the number of semiconductor devices may be decreased to ⅔ so that a size of the converter may be reduced. Although current capacitance of the device may increase, the increase may be alleviated greatly as complexity of a circuit of the alternating current (AC) to direct current (DC) converter is significantly reduced.

2. A small-sized transformer for galvanic insulation may be used: When a Scott-T transformer is used, the number of required windings of a system may be reduced to ¼ so that a system may be manufactured to have a compact size, and the system may be applied to a certain application such as railways. Also, a design of a transformer may be simplified.

3. A size of a system may be reduced: When a power converter operates in a high fundamental frequency, a size (a volume and a weight) of a Scott-T transformer operating in a medium frequency may be reduced.

4. A rectifier may operate: The Scott-T transformer in the example embodiment may use two transformers connected to different cores, and thus, a diode rectifier may be applied.

FIG. 5 is graphs illustrating voltage waveforms of a power converter according to another example embodiment.

Referring to FIG. 5, even though a phase difference between voltages $V_{T1}$ and $V_{T2}$ may not be perfect, and there is a small phase difference, a voltage imbalance generated in each leg of the AC to DC converter 230 may not affect an output voltage. According to the topology of a unidirectional power converter, a turns ratio of the transformer or an imbalance of phase shifts may not affect an operation, due to absence of magnetic coupling between two single-phase transformers. An output voltage VO may have a typical waveform of a 6-pulse diode rectifier.

FIGS. 6A to 6D are conceptual diagrams illustrating an operation performed when a bipolar grid or a plurality of unipolar grids are input in a power converter and a partial operation performed when one pole is out of service.

Referring to FIG. 6A, when a bipolar grid is provided, first and second multilevel converters may be connected in series as illustrated in the diagram. FIG. 6B illustrates a redundancy principle of when one of the multilevel converters has a fault, or when power is not supplied as one pole of an external grid is out of service. The pole having a fault may be isolated from a circuit, and the other inductor may continue to operate at a half of rated power.

However, as illustrated in FIG. 6C, when two unipolar grids are used, the first and second multilevel converters may operate independently (synchronized to a Scott-T transformer).

FIG. 6D illustrates a redundancy principle of when one of the unipolar grids has a fault. The pole having a fault may be isolated from a circuit, and the other may continue to operate at half of rated power.

FIGS. 7A to 7D are diagrams illustrating a power converter according to an example embodiment and a partial operation performed when one pole of a bipolar grid is out of service in a power converter according to another example embodiment.

Referring to FIGS. 7A to 7D, another aspect of the present disclosure is that, in the case of a bidirectional power converter or a unidirectional power converter in FIG. 1 or FIG. 3, a system level of a redundancy may be implemented in an MVDC side.

A bipolar network having a neutral line may be used, and in this case, a DC terminal $P_1$ of a first multilevel converter may be connected to a pole DC+, a DC terminal $N_2$ of a second multilevel converter may be connected to a pole DC−, and a DC terminal N1 of the first multilevel converter and a DC terminal $P_2$ of the second multilevel converter may be connected to DC0.

When one multilevel converter or one of at least two multilevel converters have a fault in the MVDC side, or when power is not supplied as one pole of an external grid is out of service, a half of the system may continuously operate in an abnormal mode through the other pole.

The multilevel converter having a fault may be isolated from the remaining portion of a circuit, and thus, the relevant transformer (in FIGS. 7A to 7C, the second transformer $T_2$) may operate based on a bypass connection circuit providing a small winding leakage inductance. Although one of three legs in an alternating current (AC) to direct current (DC) converter may not function properly, the remaining two legs may continue to operate in a similar manner to that of a single phase DAB.

While the example embodiments have been shown and described above, it will be apparent to those skilled in the art that modifications and variations could be made without departing from the scope of the present invention as defined by the appended claims.

The invention claimed is:

1. A power converter having a Scott-T transformer, comprising:
a direct current to alternating current converter configured to have at least two multilevel converters converting input direct current power to alternating current power;

the Scott-T transformer configured to operate in medium frequency of several hundreds of Hz to several tens of kHz, to transform a voltage level of the alternating current power from each of the at least two multilevel converters of the direct current to alternating current converter into three-phase alternating current power, and to output the three-phase alternating current power; and an alternating current to direct current converter configured to convert the three-phase alternating current power from the Scott-T transformer to direct current power.

2. The power converter of claim 1, wherein the direct current to alternating current converter converts an input direct current medium voltage and direct current power of a bipolar grid into an alternating current medium voltage and two phase alternating current powers having a medium frequency.

3. The power converter of claim 2, wherein the Scott-T transformer converts the alternating current power from the direct current to alternating current converter into the three-phase alternating current power of a low voltage of several kV or lower in accordance with a predetermined turn ratio.

4. The power converter of claim 3, wherein the alternating current to direct current converter converts alternating current power from the Scott-T transformer into the direct current power of a low voltage of 1500V or lower.

5. The power converter of claim 1, wherein the alternating current to direct current converter includes three legs connected to one another in parallel, each having two semiconductor switches connected to each other in series.

6. The power converter of claim 5,
wherein the three legs of the alternating current to direct current converter operates by six-step operation, and
wherein the power converter is configured as a bidirectional power converter.

7. The power converter of claim 1, wherein the alternating current to direct current converter includes three legs connected to one another in parallel, each having two diodes connected to each other in series.

8. The power converter of claim 7, wherein the power converter is configured as a unidirectional power converter.

9. The power converter of claim 1, wherein at least one of the direct current to alternating current converter and the alternating current to direct current converter operates in a medium frequency of several hundreds of Hz to several tens of kHz.

10. The power converter of claim 1, wherein a sub-module of the multilevel converter includes a half bridge, a full bridge, or combination of a half bridge and a full bridge.

* * * * *